United States Patent [19]

Kravis

[11] 4,169,901

[45] Oct. 2, 1979

[54] MEATY-FLAVORED DEEP-FAT FRYING COMPOSITIONS

[75] Inventor: David S. Kravis, Cincinnati, Ohio

[73] Assignee: The Procter & Gamble Company, Cincinnati, Ohio

[21] Appl. No.: 882,481

[22] Filed: Mar. 1, 1978

[51] Int. Cl.² ............................................. A23D 5/00
[52] U.S. Cl. ................................. 426/601; 426/606; 426/613
[58] Field of Search ............... 426/533, 601, 606, 613

[56] References Cited

U.S. PATENT DOCUMENTS

| Re. 24,791 | 3/1960 | Melnick et al. | 426/601 |
|---|---|---|---|
| 3,443,966 | 5/1969 | Reid | 426/601 |
| 3,619,211 | 11/1971 | Chang et al. | 426/533 |
| 3,780,184 | 12/1973 | Broderick et al. | 426/533 |
| 3,930,046 | 12/1975 | Baugher | 426/533 |
| 4,022,920 | 5/1977 | Doornbos et al. | 426/533 |
| 4,044,168 | 8/1977 | Steenhoek et al. | 426/613 |

*Primary Examiner*—Robert A. Yoncoskie
*Attorney, Agent, or Firm*—Rose Ann Dabek; Richard C. Witte

[57] ABSTRACT

Flavored shortening compositions useful in the deep-fat frying of foodstuffs are described. The compositions comprise (1) an edible triglyceride base fat having acyl groups of from 16 to 22 carbon atoms and wherein the smoke point exceeds 350° F. and wherein the Iodine Value is from about 30 to 150; (2) an artificial, meaty, base-fat soluble, volatile flavorant; and (3) a stabilizing agent which is an undeodorized edible oil selected from the group consisting of coconut oil, palm-kernel oil and babassu oil. The compositions are useful for imparting a meaty flavor to foodstuffs deep-fried therein for prolonged periods of time.

13 Claims, No Drawings

MEATY-FLAVORED DEEP-FAT FRYING COMPOSITIONS

BACKGROUND OF THE INVENTION

1. Field of the Invention

The present invention relates to triglyceride compositions useful as deep-fat frying shortenings and capable of delivering flavor to foodstuff materials fried therein. The present invention also relates to a novel method of stabilizing a volatile, artificial meat-like flavorant in an edible shortening so as to extend the effective delivery of the flavorant to the fried foodstuff materials over an extended period of cooking time or through repeated cycles of deep-fat frying.

2. The Prior Art

The employment of glyceride fat compositions in the deep-fat frying or deep-frying of foodstuff materials has been commonplace in home, institutional, industrial and commercial cooking operations. As a result, glyceride fat compositions intended primarily for deep-fat frying operations have comprised a significant segment of commercial shortening and oil products.

The deep-fat frying of foodstuffs involves the partial or complete submersion of the foodstuff into a bath of shortening which has been heated to elevated temperatures, thus allowing for rapid cooking. In addition to the advantage of the rapidity of cooking, any of a variety of meat and vegetable foodstuffs are commonly deep-fat fried so as to impart to the foodstuffs desirable physical and organoleptic properties produced by the deep-frying operation. Since high deep-frying temperatures are desirable in deep-frying operations, deep-frying oils have been formulated which allow deep frying at higher temperatures before being subjected to thermal degradation as evidenced, for example, by smoking. Typically, high smoke temperature deep-frying oils have been realized by formulating glyceride compositions having higher fatty acid moieties, i.e., wherein the acyl groups are in the range of 16–22 carbon atoms.

Another problem which deep-frying compositions must avoid is foaming. Foaming can result from the frying medium's retention of moisture lost from the foodstuffs while being fried. The foaming problem can be caused by the presence of emulsifiers typically contained in those shortening compositions formulated for baking, for example. Accordingly, non-foaming deep-frying compositions can be realized by limiting the presence of emulsifiers. However, foaming can occur even in deep-frying compositions which are free of emulsifiers if the compositions comprise oils having low fatty acid moeities, i.e., wherein the acyl groups are less than $C_{14}$, or wide differences in the fatty acid chain length. Thus, high smoke temperature deep-fat frying oils having high chain length fatty acids (e.g., $C_{16}$ to $C_{22}$) generally do not contain high levels of lauric acid ($C_{12}$) gylceride oils (e.g., coconut oil) so as to avoid potential foaming problems.

Further modification to the flavor of foodstuffs deep-fried by delivery of flavor from a deep-fat frying oil has been described in U.S. Pat. No. 3,480,446 (issued Nov. 25, 1969 to C. M. Hollenbeck). The addition of a flavorant to a deep-fat frying oil as a means of delivering flavor to fried foods has, however, presented a problem with regard to flavor stability or retention. Often, such flavorants, particularly artificial meat-like flavorants, comprise volatile materials. The extended heating typical of deep-fat frying over repeated cooking cycles results in a flashing off or devolatilization of the volatile flavorant with the result that effective delivery of the flavorant to the fried foodstuff materials has been limited to about 10 hours of heating and frying.

Given the state of the deep-fat frying art as described above, there is continuing need for new and useful deep-fat frying compositions with high smoke temperatures and which are non-foaming as well as which provide effective delivery of flavorants to foodstuffs fried therein for extended periods of time. Accordingly, it is an object of the present invention to provide non-foaming deep-fat frying compositions with prolonged flavor-delivery frylives.

It is a further object of the present invention to provide prolonged flavor-delivery frylife deep-fat frying compositions with high smoke temperatures and which are non-foaming.

It is a further object of the present invention to provide high smoke temperature and non-foaming deep-fat frying compositions having prolonged flavor delivery frylives that are flavored with artificial meat-like flavorants.

It has been surprisingly discovered that the above objectives can be realized and superior deep-fat frying compositions provided by formulating a composition comprising certain glyceridic base fats flavored with a volatile, artificial meaty flavorant which has been stabilized by the addition of particular amounts of certain lauric acid edible oils.

SUMMARY OF THE INVENTION

The present invention relates to meaty flavored deep-fat frying compositions containing artificial meaty flavorants which are able to impart meaty flavors to foodstuffs fried therein for extended periods of time to foodstuffs fried therein. Such compositions comprise from about 80% to 98.98% by weight of the compositions of a base fat which is an edible triglyceride having acyl groups of form about 16 to 22 carbon atoms. The base fat has a smoke point exceeding about 350° F. and has an Iodine Value between from about 30 to about 150.

The present deep-frying compositions further comprise from about 0.02% to 10% by weight of the composition of a volatile artificial meat-like flavorant which is soluble at 70° F. in the base fat to an extent of at least 10% by weight of the total weight of the composition.

The present compositions additionally comprise from about 1.0% to 10% by weight of the composition of a stabilizing agent which is an undeodorized oil selected from the group consisting of coconut oil, palm-kernel oil and babassu oil.

In its method aspect, the present invention resides in a method for prolonging the flavor-delivery frylife of an artificial, meat-like, base-fat soluble, volatile flavorant in an edible triglyceride base having acyl groups of from about 16 to 22 carbon atoms which comprises incorporating into the edible triglyceride having a flavorant an amount of stabilizing agent effective to reduce the volatility of the flavorant. The present invention further comprises a method for imparting a meat-like flavor to foodstuffs deep-fried in deep-fat compositions subjected to repeated cycles of deep-fat frying and which contain an artificial, meat-like, oil-soluble, volatile flavorant and an amount, effective to impart the flavorant to the foodstuffs through repeated cycles of deep-fat frying, of a stabilizing agent selected from the group consisting of coconut oil, palm-kernel oil, and babassu oil.

DETAILED DESCRIPTION OF THE INVENTION

The artificial meat-flavored, stabilized, deep-fat frying compositions of the present invention essentially comprise (1) a base fat comprised of triglycerides having acyl groups predominantly in the range of from 16 to 22 carbon atoms; (2) a volatile artificial meat-like savory flavor component, and (3) a stabilizing agent to decrease the devolatilization of the flavored triglyceride base fat upon prolonged heating. Each of these essential ingredients, as well as optional components, composition preparation, and composition use are discussed in detail as follows:

A. Base Fat

The instant compositions essentially contain from about 80% to 98.98%, preferably from 93% to 98.35%, by weight of an edible base fat. The base fat, of course, is the principal component of the deep-fat frying medium. The base fat used herein comprises at least 95% of triglycerides having acyl groups (fatty acid moeities) predominantly in the range of from 16 to 22 carbon atoms. Such base fats can additionally contain minor amounts (e.g., up to about 5% by weight) of mono- and diglycerides, free fatty acids, fat-soluble vitamins, and other substances. The fatty triglyceride base fat can contain glyceride hardstock materials (i.e., triglyceride materials, whether simple or complex, containing fully saturated fatty acids), and glyceride base fat materials wherein the fatty acid moiety is unsaturated or has multiple degrees of unsaturation. However, the degree of unsaturation of the base fat should be controlled whether by fractionation or by hydrogenation, for example, such that the Iodine Value (or "I.V.") ranges from 50 to about 150 preferably from 90 to about 120. Maintenance of the degree of saturation within the above indicated I.V. ranges allows the realization of base fat materials which are sufficiently plastic at room temperatures to deform with hand ladling while not being subject to rapid rancidification by oxidative degradation of the unsaturated double bonds.

Any of a variety of glyceride base-fat materials can be used in the formulation of the deep-frying composition of the present invention provided that they have a smoke temperature exceeding about 350° F., and preferably about 400° F. The glyceride base fat materials useful herein can be derived from any of the naturally occurring glyceride oils such as soybean oil, cottonseed oil, peanut oil, rapeseed oil, sesame seed oil, and sunflower seed oil. Also suitable are $C_{16}$ to $C_{22}$ fractions obtained from palm oil, lard, and tallow, as for example, by graining or directed interesterification, followed by separation of the oil.

A wide variety of suitable edible base fat compositions are known in the art and are described (as well as methods of preparation such as expression, bleaching, deodorization, fractionation, etc.), for example, in Bailey, "Industrial Oil and Fat Products," Interscience Publications (3rd ed. 1964), incorporated herein by reference. The wide variety of suitable base fat compositions can be broadly classified on the basis of their rheological properties into the broad catagories of plastic shortening materials and fluid fat materials.

Plastic shortenings are thixotropic compositions and are formulated from one or more of the following constituents: a base oil or fat (liquid glycerides), a plasticizer (solid glycerides) and an emulsifier. Because the base oil or fat is the predominant component, it has been customary to subclassify plastic shortenings according to the formulation of the base oil or fats—namely, compound or blended type and hydrogenated type. Both types may be further subdivided as all-vegetable, all-meat fat, or meat fat/vegetable oil blends.

By blending hard and soft fats and by hydrogenating soft fats, a suitable plastic consistency in shortening can be readily obtained. The rheological properties can also be adjusted by the addition of a plasticizer which usually is a glyceride hardstock material, i.e., a highly hydrogenated fat. A preferred plastic shortening useful as the base fat herein is described in U.S. Pat. No. 3,360,376 (issued Dec. 26, 1967) incorporated herein by reference.

In addition to a base oil and hard fat, many plastic shortenings additionally contain one or more emulsifying agents added to provide specific functional properties advantageous in certain specialized uses particularly in the area of baking. Shortening containing more than trace amounts of FDA-approved emulsifiers are not suitable for use herein as the base fat. The presence of the emulsifiers desirable for baking properties when present in the deep-fat frying oil tends, undesirably, to promote foaming during deep-fat frying due to the increased tendency to retain the moisure lost from foodstuffs during deep-fat frying. Discoloration, smoking and off-flavor formation may also undesirably result from the presence of such emulsifiers.

While plastic shortening compositions are suitable for use herein, fluid fat compositions are preferred for use as the base fat. Utilization of fluid fats allows the realization of artificial meat-flavored deep-fat frying compositions which are fluid or pumpable. The fluid fats are preferred for use as the base fat in the present deep-fat frying compositions since the fluid fats provide the performance of plastic shortenings while offering the handling convenience of a liquid. The term, "fluid fat," as used herein with reference to the base fat component or to the deep-fat frying compositions herein, refers to a triglyceride composition characterized by a fluid consistency over a normal range of room temperatures and having a sufficiently low content of glycerides of melting point higher than 60° F. as to provide, upon cooling of the composition from 100° F. to 60° F., an increase in the amount of solids of not more than about 20%. Such fluid fats will, thus, be readily pourable at room temperatures and will be appreciated as being fluid or liquid as these terms are commonly understood in the art. These fluid fats include those materials often referred to in the art as salad and cooking oils.

The fluid fats' rheological properties are a function of the liquid triglyceride base oil, the type and, more importantly, the amounts of the high melting point hardstock which can be added to the triglyceride base oil, and the manner in which these materials are processed. The hardstock should not be present in an amount sufficient to reduce the fluid properties of the fluid fat. A sufficiently fluid fat can be realized if the hardstock constituents' contribution to the fluid fat is such that the Solids Content Index (hereinafter, "SCI") of the fluid fat is less than about 5 at 50° F. Glycerides having greater SCI values can have their SCI contents reduced to the levels preferred herein by chilling the glyceride to precipitate high melting components and filtering to remove the solids (winterizing). As a result of the low solids content of the glyceride base fat materials at 60° F., the preferred shortening compositions of the invention can be processed to remain liquid and stable against separation of components over normally encountered temperatures.

A preferred fluid fat type of base fat composition comprises a suspension of a hardstock constituent in particulate form in a glyceride oil vehicle. The hardstock constituent amounts to from about 1% to about 11% by weight of the base fat, preferably from about 2% to about 5% by weight. It consists of substantially fully hydrogenated normally solid fatty triglyceride (and optionally, also of normally solid fatty emulsifier). The hardstock constituent ordinarily has an Iodine Value of less than about 15; preferably, it has an Iodine Value ranging from about 1 to about 12.

The normally solid fatty triglyceride in the hardstock constituent, i.e., the triglyceride hardstock, amounts to from about 1% to about 11% by weight of the base fat, preferably from about 2% to about 5%. It ordinarily contains in each of its acid moieties from about 12 to about 22 carbon atoms. It has an iodine value less than about 15; preferably, it has an Iodine Value ranging from about 1 to about 21. It consists of from about 85% to 100% by weight of beta-tending triglyceride and from 0% to about 15% by weight of non-beta-tending triglyceride. Preferably, the triglyceride hardstock is all beta-tending triglyceride. If the triglyceride hardstock contains non-beta-tending triglyceride, the non-beta-tending triglyceride usually amounts to at least about 0.5% by weight of the triglyceride hardstock. The phrase, "beta-tending," is used herein to denote triglyceride hardstock which, when melted and then cooled, has a propensity for crystallizing in the beta polymorphic phase rather than in either the alpha or beta-prime polymorphic phases. The phrase "non-beta-tending" hardstock is used herein to define triglyceride hardstocks which when melted and then cooled have a propensity for crystallizing in either the alpha or beta-prime polymorphic phases instead of in the beta polymorphic phase. The alpha, beta, and beta-prime polymorphic shortening phases are described in Holman and Quimby, U.S. Pat. No. 2,521,219 (issued Sept. 5, 1950) and incorporated herein by reference.

The beta-tending triglyceride in the hardstock can be, for example, substantially completely saturated triglyceride fats containing major amounts, for example, more than 40% of tristearin, tripalmitin, and/or symmetrical palmitodistearin. Suitable normally solid triglycerides having strong beta-forming tendencies include, for example, substantially completely hydrogenated triglyceride fats derived from soybean oil, corn oil, cottonseed oil, hazelnut oil, lard, linseed oil, olive oil, peanut oil and sunflower seed oil. Substantially, completely hydrogenated soybean oil, for example, soybean oil hydrogenated to an Iodine Value of 8 is a preferred beta-tending triglyceride constituent.

In the finished deep-frying fat composition, substantially all of the triglyceride hardstock constituent will be present in the beta polymorphic phase. This can be achieved despite the fact that some non-beta-tending triglyceride hardstock is utilized as part of the hardstock constituent. The hardstock triglyceride will normally have a particle size in the range of from about 5 microns to about 200 microns, preferably from about 10 microns to about 100 microns. The presence of the triglyceride hardstock constituent in the beta phase and of all of the hardstock constituent in particulate form allows the successful processing of the hardstock and oil vehicle constituents into a shortening having a stable liquid or fluid state. This is because the beta phase is the most stable polymorphic phase, and beta phase triglyceride hardstock in the liquid oil tends to remain in this polymorphic state whereby the continued liquidity of the oil is not disturbed; on the other hand, liquid triglyceride hardstock crystallized in alpha and/or beta-prime phases tends to convert to the beta phase forming interlacing crystal structures and eventually result in a plastic shortening being formed. As a result of the particle size specified herein, the product is not grainy and can be processed to be exceptionally stable against gravity separation of solid and liquid components and, moreover, can be processed so as to be pourable and not unduly viscous.

The fluid fat which comprises the preferred base fat of the deep-fat frying composition of the present invention will preferably be a triglyceride having acyl groups predominantly in the range of from 16 to 22 carbon atoms and having a polyunsaturated character. Preferred polyunsaturated triglycerides include those derived from soybean, cottonseed, peanut, safflower and sunflower seed. Fluid fats which can be utilized as the preferred base fat of the meat-flavored deep-fat frying composition of the invention are known in the art. Examples of such fat materials and methods for their preparation can be found in U.S. Pat. Nos. 2,815,285, issued Dec. 3, 1957 to Holman et al., and 3,595,674, issued July 27, 1971 to Shaffer et al., each of which is incorporated herein by reference. Other fluid fat materials can, however, be suitably employed.

B. Artificial Meaty Flavorants

The instant compositions also comprise essentially from about 0.02% to about 10%, preferably from 0.15% to 2.0%, and most preferably from 0.2% to 1.0% by weight of a volatile, base fat soluble (i.e., soluble in the base fat to an extent of at least 10% by weight at 70° F.) artificial meat-like flavorant. The deep-fat frying of foodstuffs in flavored deep-fat frying compositions imparts a desirable flavor to the fried foodstuffs. Specific levels of the artificial meat-like flavorants in the present deep-fat frying compositions will, of course, depend upon such considerations as the strength of the meaty flavor desired to be imparted to the deep-fat fried foodstuffs, the particular artificial meaty flavors utilized, the foodstuff being prepared, and the amount of stabilizing agent in the deep-fat frying composition.

A wide variety of suitable artificial flavors appreciated as being meat-like or meaty flavors are known in the art and are commercially available. The skilled artisan will further appreciate that the term "artificial" used herein refers to flavors which are manufactured from select raw materials. Such artificial meaty flavors are to be distinguished from natural meaty flavors obtained from natural meat sources such as by water or other solvent extraction from meat muscle or steam stripping of meat fat extracts.

Artificial meaty flavors useful herein can be broadly classified into the categories of compounded artificial flavors and reaction product flavors. Compounded flavors comprise mixtures of select components which, upon simple mixing, produce meat-like flavors. Illustrative of this type of compounded artificial meaty flavors and methods for their preparation are the lard flavor concentrates disclosed in U.S. Pat. No. 3,767,429 (issued Oct. 23, 1973 to C. E. Burke and which is incorporated herein by reference) comprising a mixture of certain aldehydes, pyrazine-derived compounds, and pyroligneous acid. Such compounded artificial lard flavors are especially useful herein as the flavorant component of the present deep-frying compositions. Other compounded artificial flavors can, however, be suitably employed, such as those disclosed in U.S. Pat. No. 3,318,710 (issued May 9, 1967 to Sakaguchi et al. incorporated herein by reference).

Reaction product flavors of a meaty character are also suitable for use herein as the artificial meaty flavorant component. Such flavors are the reaction products of Strecker degradation or Maillard browning reactions between reducing sugars and amino acids either in the presence or absence of a fatty material. Examples of this type of reaction product artificial meaty flavor are the Maillard-type reaction flavors disclosed in U.S. Pat. No. 3,532,514 (issued Oct. 6, 1970 to May), incorporated herein by reference, which are prepared by heating a mixture comprising cysteine, a hexose or pentose, and a fatty acid or fatty acid triglyceride. Similar products which are also useful herein are produced by the process disclosed in U.S. Pat. No. 3,493,395 (issued Feb. 3, 1970 to Soeters) which is incorporated herein by reference. Other artificial, reaction product meaty flavorants suitable for use herein as well as method for their preparation are disclosed in, for example, U.S. Pat. No. 3,524,747 (issued Aug. 18, 1970 to O'Hara et at.), U.S. Pat. No. 3,318,710 (issued May 9, 1967 to Sakaguchi et al.), U.S. Pat. No. 3,532,515 (issued Oct. 5, 1970 to Broderick et al.), U.S. Pat. No. 3,780,184 (issued Dec. 18, 1973 to Broderick et al), U.S. Pat. No. 2,934,437 (issued Apr. 26, 1960 to Morton et al.), U.S. Pat. No. 3,532,514 (issued Oct. 6, 1970 to C. G. May), and U.S. Pat. No. 3,394,016 (issued July 23, 1968 to Bidmead et al.) each of which patents are included herein by reference.

In addition to either compounded artificial meaty flavors and reaction product flavors, the present artificial meaty flavorants can further comprise flavor enhancers and edible organic acids. Suitable flavor enhancers include, for example, table salt, monosodium glutamate, and ribonucleotides (e.g., guanosine 5'-ribophosphate and inosine 5'-ribophosphate). The organic acid can be any edible organic acid but is preferably selected from the group consisting of succinic acid, malic acid, lactic acid, citric acid and acetic acid.

For convenience of use, the suitable artificial meat-like flavors described above are typically dispersed in a liquid edible oil carrier prior to being added to the base fat component of the present invention. Suitable carriers include, for example, glyceride oils, propylene gylcol, and triacetin.

C. Stabilizing Agent

The instant compositions essentially contain from about 1% to 10%, preferably from 1.5% to 5%, by weight of a stabilizing agent. The addition of certain stabilizing agents to a deep-fat frying base fat to which has been added volatile, artificial meat-like flavors can markedly prolong the delivery of such meat-like flavors to foods being deep-fried therein. Without the addition of the stabilizing agent, the prolonged heating of the frying medium can result in a relatively rapid devolatilization of the present volatile artificial meat-like flavorants. This devolatilization of the flavorant precludes the effective delivery of the flavorant to the fried foodstuff materials when the flavored deep-frying compositions are used over an extended period of time. Thus, the addition of the stabilizing agent markedly prolongs the flavor-delivery frylife of the present compositions.

Suitable stabilizing agents include coconut oil and the other oils closely related to it, such as those obtained from the kernels of the various palm nuts, such as palm-kernel oil. Also suitable for use as the stabilizing agent are other lauric acid oils (i.e., oils containing at least 15% by weight of the stabilizing oil of lauric acid) and include, for example, babassu oil, cohune oil, muru muru oil, tucum oil and ucuhula tallow. Preferably, the stabilizing agent is selected from the group consisting of coconut oil, palm-kernel oil, babassu oil and cohune oil. Coconut oil is the most preferred stabilizing agent used herein. While the subsequent discussion herein generally refers to coconut oil, it will be appreciated that such considerations also apply to the other suitable stabilizing agents.

It is important that the coconut oil used herein be undeodorized. Deodorization refers to the processing of an edible oil which serves to remove certain materials which impart a taste or color characteristic to the oil. At the high temperatures employed using the typical method of vacuum steam distillation, the odoriferous compounds of the coconut oil become sufficiently volatile to be stripped out by a current of steam, from the relatively non-volatile remaining oil. While not wishing to be bound by the proposed theory, it is speculated that typical deodorizing processes remove or destroy components naturally occurring in undeodorized coconut oil which effectuate the stabilizing effect. Such a proposition is supported by the finding that deodorized coconut oil (e.g., coconut oil which has been steam-stripped under 28 to 29 inches of vacuum for 2 hours with 1.1 to 5 pounds of superheated steam per pound of coconut oil at 450° F.) does not prolong the delivery of flavor from a deep frying base fat flavored with artificial meat-like flavor described above. The compounds responsible for the stabilizing effect have not been identified but probably consist variously of aldehydes, ketones, fatty acids, esters, and essential oils, to the amount of 0.10% of the weight of the oil.

Preferably, the undeodorized coconut oil used herein is also bleached. Oils are typically treated to remove certain materials responsible for imparting color to the oil such as carotenoids and chlorophyll. Carotenoid (provitamin A) materials are the principal colorants in coconut oil. Typically, bleaching operation comprises the addition of a bleaching powder (e.g., Fuller's earth, diatomaceous earth, or activated carbon) with subsequent filtration. The temperatures employed are usually in the neighborhood of 180° F. to 250° F. and the process may be carried out under vacuum. The bleaching process is quite drastic in its chemical effect upon the vegetable oil and many of the minor constituents which undergo complete chemical change and may even be removed completely. Bleaching of certain oils can also be carried out by oxidation. Thus, coconut oil can be bleached by aeration at temperatures from 95°-100° C. If the undeodorized coconut oil used herein is bleached, it is preferably bleached by utilizing bleaching powders rather than by utilizing aeration.

D. Optional Components

The deep-frying fat compositions of the present invention can contain a variety of optional additive materials commonly employed in deep-frying edible fats and oils. Thus, for example, the present compositions can contain colorants, antioxidants and antifoaming agents. Suitable antioxidants include, in addition to naturally occurring antioxidants, butylated hydroxytoluene, butylated hydroxyanisole, and citric acid. Suitable antifoaming agents include edible polyorgano-siloxane materials such as DC-200 and antifoam A, both manufactured by Dow Corning Corporation. If present, the optional anti-oxidant materials can be present in amounts ranging from about 0.01% to 2.0% anti-oxidants by weight of the present deep-frying compositions while the anti-foaming agents can be present in amounts ranging from about 0.5 ppm to 10 ppm by weight of the present deep-frying compositions.

Fluid fat compositions suitable for use as pan-frying and griddling compositions commonly contain small amounts of lecithin, usually in the range of about 0.1% to 0.5% by weight of the composition, to provide anti-sticking properties. While lecithin may be desirably included in such pan-frying and griddling compositions, it is not optionally included in the present deep-frying compositions. Lecithin in deep-frying compositions upon heating to typical deep-frying temperatures undesirably transforms into a floculant precipitate which darkens the base fat and is visible as black specks permeating the deep-frying compositions. In addition to being perceived as impurities in the deep-frying fat, the lecithin can adhere to food being deep-fried and thereby present a visually dark and unattractive appearance to the foods which have been deep-fried.

Composition Preparation

The deep-fat frying compositions of the present invention are prepared simply by mixing together in any order and by any conventional means the essential and optional components herein. Typically, the flavorant(s) and stabilizing agent are added to a mixing vessel which has been previously charged with the base fat. If utilized, optional components are also added to the mixing vessel prior to agitation. When a plastic shortening is employed as the base fat, the base fat is preferably heated to a fluid state (e.g., about 150° F.) to permit more readily the mixing of the components. After the components are thoroughly mixed, the composition is brought to room temperature in a conventional manner and packaged in conventional packaging or dispensing means.

Composition Use

The artificially meat-flavored deep-frying composition of the present invention can be utilized in any number of deep-frying operations or with any number of foodstuffs to impart to the foodstuffs deep-fried therein, a meat-like flavor for extended frying periods. The term "deep-frying" refers to the cooking of foodstuffs which are partially or completely immersed in the flavored deep-frying fat composition of the present invention. Thus, deep-frying operations typically practiced in the home and in industrial or institutional cooking operations are contemplated within the method of the present invention. The repeated cycles of deep-frying operations conventionally practiced in restaurant cooking are likewise contemplated.

The flavored deep-frying compositions of the present invention can be advantageously used to impart a meaty flavor to a variety of foodstuffs deep-frying therein. For example, various cuts of potatoes can be deep-fried in the present compositions in the normal manner of deep-frying to impart to the potatoes any of a variety of desired meaty flavors. Similarly, various batter-covered meats may have their exterior batter flavor enhanced by deep-frying in the present compositions. Such applications include, for example, deep-frying of breaded pork or veal and batter-covered chicken.

In its method aspect, the present invention encompasses the prolonging of the flavor delivery frylife of an artificial, meat like, base fat soluble, volatile flavorant in an edible cooking oil which comprises the incorporating in an edible cooking oil having a volatile flavorant, an amount of stabilizing agent effective to stabilize the volatile flavorant. The present invention further comprises a method for imparting a meat-like flavor to foodstuffs deep-fried in deep-fat compositions subjected to repeated cycles of deep-fat frying and which contain an artificial, meat-like, oil-soluble, volatile flavorant and an amount, effective to impart the flavorant to the foodstuffs through repeated cycles of deep-fat frying, of a stabilizing agent which is an undeodorized edible oil selected from the group consisting of coconut oil, palm-kernel oil, cohune oil and babassu oil.

The following examples illustrate certain preferred embodiments of the invention and are not intended as limiting the invention.

EXAMPLE I

A fluid deep-frying composition is prepared by combining a triglyceride oil-base fat with additives in the following manner. Approximately 1330 g. of base fat (a bleached and deodorized mixture of 96.5% weight % soybean oil hardened by hydrogenation to an I.V. of 107; 3.5 weight % soybean oil hardened to an I.V. of 8; the mixture having an SCI value of 3 to 50° F., and a smoke point of 440° F., and approximately 3 to 6 ppm methyl silicone*) is placed in a 5-quart, home-type deep-fat fryer. The deep-frying composition is made by adding the following ingredients to the base oil.
*D.C.-200 marketed by Dow Corning Corporation

| Base oil (as in above) | 1330.67 g. | 97.7% |
| Undeodorized coconut oil | 27.24 g. | 2.0% |
| Artificial pork flavor** | 4.09 g. | 0.3% |
| TOTAL | 1362.00 g. | 100.0% |

**A commercial artificial flavor comprising a mixture of fatty acid/reducing sugar reaction product flavors marketed by the Renaud, Ltd. (Stock No. R 2118/A).

The blend is then mixed by hand for approximately one minute. An aliquot portion is selected for subsequent evaluation. Two control compositions are similarly prepared by adding 27.24 g. of undeodorized coconut oil to 1335 g. base oil and by adding 4.1 g. artificial pork flavor to 1358 g. base oil.

The fluid deep-frying composition so prepared is effective in imparting a meaty flavor to foodstuffs deep-fried therein. The composition exhibits the flavor-delivery property for extended periods of time including repeated cycles of deep-frying. Thus, the deep-frying composition provides a prolonged flavor-delivery frylife.

Deep-frying compositions of substantially similar flavor-delivery frylife are realized when in the Example I fluid deep-frying composition, the soybean oil base fat is replaced with an equivalent amount of cottonseed oil, sunflower seed oil or peanut oil.

Deep-frying compositions of substantially similar flavor-delivery frylife and antifoaming properties are realized when in the Example I fluid deep-frying composition, the methyl silicone is replaced with an equivalent amount of "Antifoam A" (marketed by Dow Corning Corporation) or SF-96 (marketed by General Electric Company).

EXAMPLE II

A fluid deep-frying shortening is prepared following the procedure of Example I except that the artificial flavor used in an artificial tallow flavorant, and the amounts are as follows:

| Base oil | 1327.95 g. | 97.5% |
|---|---|---|
| Undeodorized coconut oil | 27.24 g. | 2.0% |
| Artificial tallow flavor* | 6.81 g. | 0.5% |
| TOTAL | 1362.00 g. | 100.0% |

*A commercial artificial flavorant marketed by International Flavors and Fragrances, Inc. (St. No. 13538134)

Test portions are taken, and controls are prepared as in Example I.

EXAMPLE III

As in Example I, but using a different artificial pork flavor

| Base oil | 1327.95 g. | 97.5% |
|---|---|---|
| Undeodorized coconut oil | 27.24 g. | 2.0% |
| Artificial pork flavor* | 6.81 g. | 0.5% |
| TOTAL | 1362.00 g. | 100.0% |

*A commercial artificial flavorant marketed by International Flavors and Fragrances, Inc. (St. No. 13538776).

Test portions are taken, and controls are prepared similarly.

EXAMPLE IV

As in Example I, except artificial flavor consists of a combination of artificial bacon and artificial fried-fat flavors.

| Base oil | 1330.68 g. | 97.7% |
|---|---|---|
| Undeodorized coconut oil | 27.24 g. | 2.0% |
| Artificial bacon flavor* | 2.04 g. | 0.15% |
| Artificial fried-fat flavor* | 2.04 g. | 0.15% |
| TOTAL | 1362.00 g. | 100.00% |

*Commercial artificial flavorants marketed by Polak's Frutal Works (St. No's. 520064U and 530007U, respectively).

Test portions are taken and controls are prepared similarly.

PRODUCT EVALUATIONS

The compositions of Example I–IV are evaluated in the following manner. Each test product and its controls is heated in 5-qt. home-type deep-fat fryers to 360° F.±5° F. The heating period is approximately 20–30 minutes. Once the desired temperature is reached and is stable, approximately 136 g. of commercially available frozen shoestring potatoes (manufactured by J. R. Simplot Co.), similar to those used by restaurants and fast food outlets, is placed in the fat composition and is fried for approximately 3½ minutes. After frying, the deep-fried french fries are removed from the oil, allowed to drain for approximately 30 seconds, and are placed in plain aluminum plates. Organoleptic evaluations are conducted by a panel of trained flavor experts. Each expert eats approximately 25 g. of each french-fry product. The order of tasting is randomized to avoid taste bias. Each sample is then evaluated for character and amount of meaty flavor as well as several other important flavor attributes. The sensory evaluation scale employed consists of nine points ranging from 1 (none) to 9 (high). Minimum effective flavor level is set at 1.5. The fat compositions are evaluated as outlined above about 20–30 minutes after testing starts and, thereafter, about every four hours until flavor is no longer detectable or until the test is concluded and conclusions can be drawn. Results of the expert evaluations are described in Table I as follows:

TABLE I

FLAVOR-DELIVERY FRYLIFE

| | Composition | Hours Flavor Lasted |
|---|---|---|
| 1. | Base oil-98.0%<br>Undeodorized coconut oil-2.0% | 8, 10¼, 12, 13-Avg. 10.9±2.2 |
| 2. | Base oil-99.7%<br>Artificial pork flavor #1-0.3% | 6, 8-Avg. 7.0±1.4 |
| 3. | Base oil-99.7%<br>Artificial bacon flavor-0.15%<br>Artificial fried fat flavor-0.15% | 6, 8, 8, 9, 12-Avg. 8.6±2.2 |
| 4. | Base oil-99.5%<br>Artificial tallow flavor-0.5% | 8-11¼-11¼ max. |
| 5. | Base oil-99.5%<br>Artificial pork flavor #2-0.5% | 8-11¼-11¼ max. |
| 6. | Base oil-97.7%<br>Undeodorized coconut oil-2.0%<br>Artificial pork flavor #1-0.3% | 18 |
| 7. | Base oil-97.7%<br>Undeodorized coconut oil-2.0%<br>Artificial bacon flavor-0.15%<br>Artificial fried fat flavor-0.15% | 18 |
| 8. | Base oil-97.5%<br>Undeodorized coconut oil-2.0%<br>Artificial tallow flavor-0.5% | 20 |
| 9. | Base oil-97.5%<br>Undeodorized coconut oil-2.0%<br>Artificial pork flavor #2-0.5% | 20 |

As can be seen from the above Table I, the fluid deep-frying compositions 6 through 9 of the present invention containing additive amounts of undeodorized coconut oil in a triglyceride oil-base fat flavored with volatile, oil-soluble, artificial meaty flavorants, exhibit substantially prolonged flavor-delivering propensities of the flavored base fats. Compositions 2–5, although containing similar levels of artificial flavorants do not contain the requisite amounts of undeodorized coconut oil as a stabilizing agent. As a result, these compositions 2–5 exhibit substantially shorter flavor-delivery frylives.

EXAMPLE V

A plastic shortening type of deep-frying composition is prepared by combining a triglyceride oil-base fat with additives in the following manner. Approximately 1330 g. of base fat (a bleached and deodorized soybean oil hardened by hydrogenation to an I.V. of 70; having an SCI value of 25 at 50° F. and a smoke point of 440° F.) is placed in a 5-quart home-type deep-fat fryer. The deep-frying composition is made by adding the following ingredients to the base oil.

| Base fat (as in above) | 1327.95 g. | 97.5% |
|---|---|---|
| Undeodorized coconut oil | 27.24 g. | 2.0% |
| Artificial tallow flavor* | 6.81 g. | 0.5% |
| TOTAL | 1362.00 g. | 100.0% |

*A commercial artificial flavorant marketed by International Flavors and Fragrances, Inc. (St. No. 13538134).

The blend is mixed, test portions are taken, and controls are prepared as in Example I. The compositions is evaluated as were Examples I–IV. Results of the expert evaluation of the composition of Example V are described in Table II as follows.

TABLE II

| | FLAVOR-DELIVERY FRYLIFE | |
|---|---|---|
| Composition | | Hours Flavor Lasted |
| 1. | Base fat-98.0% Undeodorized coconut oil-2.0% | 12 |
| 2. | Base fat-99.5% Artificial tallow flavor-0.5% | 10 |
| 3. | Base fat-97.5% Undeodorized coconut oil-2.0% Artificial tallow flavor-0.5% | 20 |

As can be seen from the above Table II, the plastic deep-frying Composition 3 of the present invention containing additive amounts of undeodorized coconut oil in a triglyceride oil-base fat flavored with a volatile, oil-soluble, artificial meaty flavorant exhibits substantially prolonged flavor-delivering propensity of the flavored base fat. Composition 2, although containing similar levels of artificial flavorant does not contain the requisite amounts of undeodorized coconut oil as a stabilizing agent. As a result, Composition 2 exhibits substantially shorter flavor-delivery frylife.

What is claimed is:

1. A deep-fat frying composition suitable for imparting a meaty flavor to foodstuffs fried therein; comprising:
   A. from about 80% to 98.9% by weight of the composition of a base fat containing at least about 95% by weight of the base fat of an edible triglyceride having acyl groups in the range of from 16 to 22 carbon atoms, and wherein the base fat has a smoke point exceeding about 350° F., and wherein the Iodine Value of the base fat ranges from 30 to about 150;
   B. from about 0.02% to 10% by weight of the composition of volatile, artificial meat-like flavorant which is soluble in the base fat to an extent of at least 10% by weight of the flavorant based on the total weight of the composition at 70° F.;
   C. from about 1% to 10% by weight of the composition of a stabilizing agent to prolong the flavor delivery frylife which is an undeodorized edible oil selected from the group consisting of coconut oil, palm-kernel oil, cohune oil, muru muru oil, ucuhuba tallow, and babassu oil.

2. The composition of claim 1 wherein the stabilizing agent is selected from the group consisting of coconut oil, palm-kernel oil, and babassu oil.

3. The composition of claim 2 wherein the stabilizing agent is coconut oil.

4. The composition of claim 2 wherein the stabilizing agent comprises from about 1.5% to 5% by weight of the composition.

5. The composition of claim 3 wherein the flavorant comprises from about 0.15% to 2% by weight of the composition.

6. The composition of claim 4 wherein the base fat is a fluid fat and has an Iodine Value of about 90 to 120 and contains from about 1% to 11% by weight of a triglyceride hardstock.

7. The composition of claim 6 wherein the triglyceride hardstock has an Iodine Value ranging from about 1 to about 12.

8. The composition of claim 6 wherein the triglyceride hardstock is a substantially completely hydrogenated soybean oil.

9. The composition of claim 7 wherein the edible fluid triglyceride base fat having acyl groups of from 16 to 22 carbon atoms comprises soybean oil.

10. The composition of claim 9 wherein the flavorant comprises from about 0.2% to 2% by weight of the composition.

11. The composition of claim 8 further comprising from about 0.01% to 2% by weight of the composition of an antioxidant selected from the group consisting of butylated hydroxytoluene, butylated hydroxyanisole and citric acid.

12. The composition of claim 9 further comprising from about 0.5 ppm to 10 ppm of an antifoaming agent which is an edible, non-aqueous methyl silicone.

13. A method for prolonging the flavor-delivery frylife of a deep-fat frying composition which comprises adding from about 1.0% to 10% by weight of the composition of a stabilizing agent which is an undeodorized edible oil selected from the group consisting of coconut oil, palm kernel oil, and babassu oil, to deep-fat frying compositions comprising
   A. from about 80% to about 98.9% by weight of the composition of a base fat containing at least 95% by weight of the base fat of an edible triglyceride having acyl groups in the range of 16 to 22 carbon atoms, and wherein the base fat has a smoke point exceeding 350° F. and wherein the iodine value of the base fat ranges from about 30 to about 150;
   B. from about 0.02% to 10% by weight of the composition of volatile, artificial meat flavorant which is soluble in the base fat to an extent of at least 10% by weight of the flavorant based on the total weight of the composition at 70° F.

* * * * *